United States Patent Office 2,958,867
Patented Nov. 1, 1960

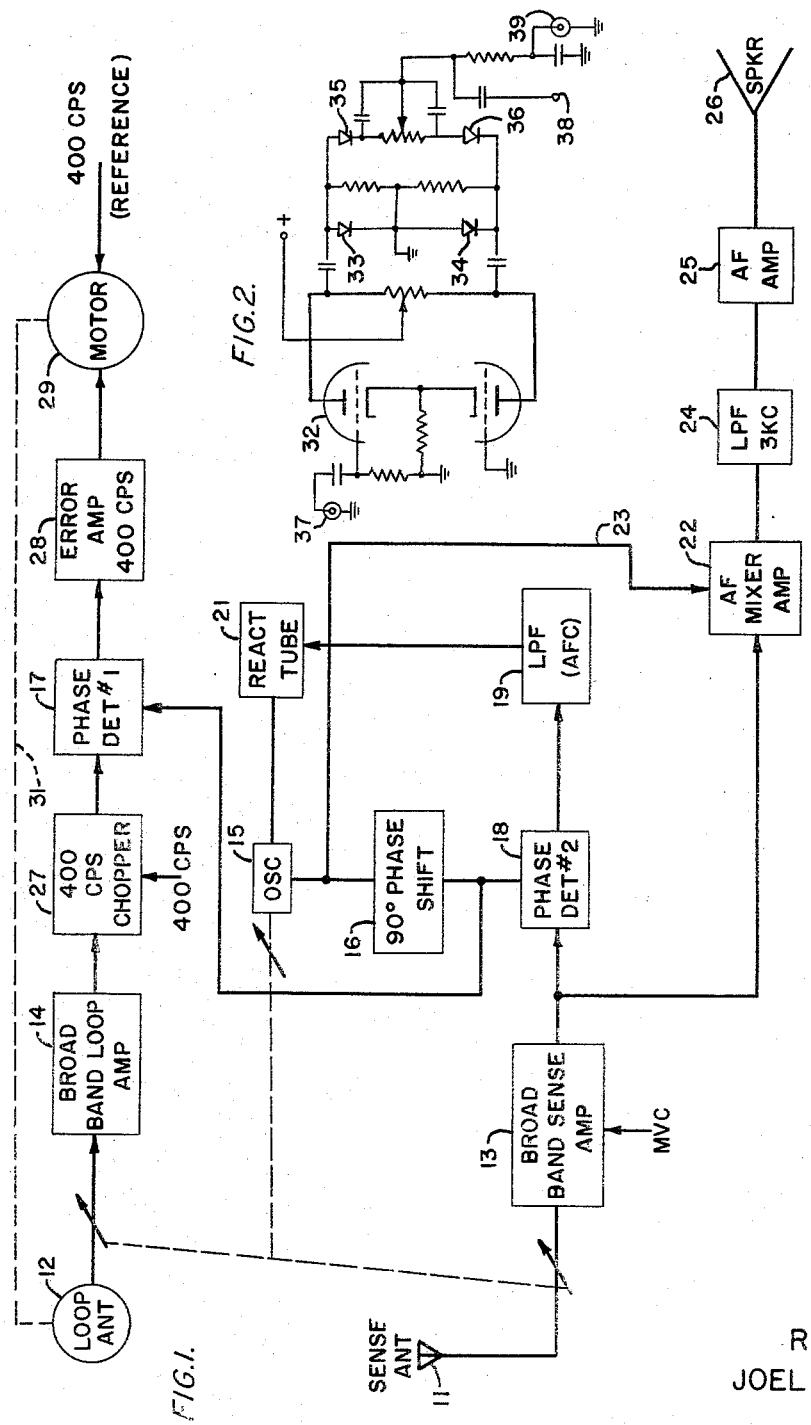

2,958,867

AUTOMATIC DIRECTION FINDER

Ruel Colvin, Washington, D.C., and Joel L. Ekstrom, Baltimore, Md., assignors to The Bendix Corporation, a corporation of Delaware Filed Dec. 3, 1958, Ser. No. 777,883

7 Claims. (Cl. 343—117)

This invention relates generally to automatic direction finding radio receivers and more particularly to receivers of the type employing a sense antenna and a rotatable loop antenna which is automatically oriented to indicate the direction from the location of the radio receiver to the source of radio waves being received.

Various automatic direction finding equipments are well known. Equipments of this type which employ a sense antenna and a rotatable loop antenna constitute one of the standard navigational aids employed in present day aircraft. The general acceptance of equipment of this type is due in part to the excellent performance which has been obtained with the present day commercially available automatic direction finders which when employed with charts indicating the locations of the transmitting stations on the radio range permit a pilot to determine the bearing to a selected station for any particular location where he may be flying. As the volume of air traffic increases and the number of additional types of flight service are instituted, the need for greater reliability in the navigational aids as well as for reduced size and weight and decreased cost of the equipment employed become more demanding. While the prior art direction finding equipment has proved to be generally satisfactory from an operational viewpoint under ideal conditions it is well known that detection of signals sufficient to obtain a bearing indication is adversely affected by conditions of interference such as caused by flying in the neighborhood of man-made interference caused by radiating instrumentalities such as radar or the like or natural sources of interference such as precipitation static and the radio interference normally accompanying a thunderstorm. In both of these situations the need for the reliability of the navigational aid is a maximum whereas in prior art equipment the operational performance of the equipment under these conditions is sometimes low and often unusable.

Accordingly, it is a primary object of the present invention to provide a new and improved automatic direction finding receiver equipment which provides a high degree of immunity to interference and enables bearing signals to be received in a high interference ambient.

A further object of this invention is to provide new and improved receiver circuits in an automatic direction finder equipment which provide reduction in size and weight as well as the cost of and complexity of the receiving equipment.

A still further object of this invention is to provide an improved detection circuit in an automatic direction finder for reducing the complexity of the equipment and improving the reliability of the equipment and the ability of the equipment to operate reliably under all conditions.

These and other objects of the invention will be apparent from the following detailed description taken in conjunction with the accompanying drawing wherein:

Fig. 1 shows in block diagram form an automatic direction finder (ADF) radio receiver in accordance with the invention; and Fig. 2 is a schematic circuit diagram of a portion of the system.

The present invention employs coherent exalted carrier demodulation with a phase lock automatic frequency control system to provide detection of directional radio signals and obtaining a bearing indication. An automatic direction finder equipment of this type operates reliably in substantially higher noise levels than commercially available equipment now employed for this purpose.

Referring to the drawing, a system is shown as comprising a conventional omnidirectional sense antenna 11 and a directional loop antenna 12 for the purpose of sensing respectively in an omnidirectional signal pattern and a figure eight signal pattern. The combination of patterns of this type produces the well-known effective cardioid pattern for direction finding by rotating the loop antenna 12 about a vertical axis to a point corresponding to the null bearing direction of the cardioid pattern. The signals from the antennas 11 and 12 are coupled to tuned circuit arrangements at the inputs of broadband amplifiers 13 and 14, respectively. These amplifiers are essentially the same and may comprise, for example, an input tuned circuit which is tuned over the ADF band of 200–400 kc. by means of a variable capacitor tuning circuit in a well-known manner. The succeeding stages of the amplifiers 13 and 14 may comprise resistance capacitance coupled amplifiers for further amplifying the signal which is selectively amplified by the first stage of each channel. The band width of the RC coupled amplifiers may be conveniently from a relatively low frequency to approximately 500 kc. to pass through the amplifier channels 13, 14, the signals and the modulation side band components contained therein. The gang tuning of the input circuits for the amplifiers 13, 14 is effected with sufficient accuracy to maintain 90° phase relation between the signals which are coupled thereto from the sense and loop antennas, respectively.

An oscillator 15 is provided and is tunable by any conventional means over the same band over which the amplifiers 13, 14 are tuned. Oscillator 15 is also accurately tracked with the tuning of the amplifiers 13, 14. The output of oscillator 15 is applied to a 90° phase shifter 16, which may be a capacitively plate loaded pentode, the output of which is applied to a phase detector 17 and a phase detector 18. The output of phase detector 18 is coupled to a low pass filter 19 the output of which is coupled to reactance tube 21 which in turn is connected to control the frequency and phase of oscillator 15.

The output signal from the amplifier 13 is applied to an audio frequency mixer amplifier 22 which also has applied thereto via line 23 a signal from the oscillator 15 which is not passed through the phase shifter 16. The AF mixer 22 may employ a pentagrid converter tube with the oscillator signal coupled to the first grid and the sense channel signal coupled to the third grid for mixing action therebetween in a manner known in the art. The mixer amplifier 22 may also include a variable resistance element in the cathode circuit of the pentagrid converter tube for adjusting the rectification point to obtain no audio signal output when a modulated signal is applied to the #3 grid and the oscillator disconnected from grid #1. The output of mixer 22 is applied to a low pass filter 24, an audio amplifier 25 and a speaker 26 for the aural detection and identification of identifying signals and audio communication with the received station.

The signal from loop channel amplifier 14 is preferably, for example, applied to a 400 c.p.s. chopper 27 which is driven synchronously with a 400 c.p.s. reference voltage such as ordinarily available on aircraft. The output of the chopper 27 is applied to the phase detector 17 to produce bearing information signals when the local oscillator 15 is locked to an incoming signal as will be hereinafter described. The output of phase detector 17 consists of a 400 c.p.s. error voltage which, after amplification and filtering in an error amplifier 28, has the proper phase to drive the loop antenna 12 so as to reduce the loop channel output to a unilateral null. This servo action is accomplished by applying the output of the error amplifier 28 to a suitable servo motor 29 which also is connected to the 400 c.p.s. reference which drives the chopper 27. The mechanical connection between the motor 29 and the loop 12 indicated at 31.

The operation of the system of the present invention is based on the principles of coherent exalted carrier demodulation wherein the desired signal consisting of a carrier, with or without sidebands, is multiplied in a phase detector by a large locally generated carrier of the same frequency which is phase locked to the carrier of the incoming signal. This operation may be characterized in terms of the system presently disclosed as producing a low frequency output of the detector 17 consisting of a D.C. term plus modulation spectra, if present, frequency translated directly into the audio spectrum. For example, consider an incoming signal of the following form:

$$E_{IN} = E_1 \sin \omega_c t \, (1 + k \sin \omega_m t)$$

Where the local oscillator has a frequency $\omega_c$ but may have phase angle $\theta$ relative to the carrier of the input signal which also has a frequency $\omega_c$. The local oscillator signal therefore will be:

$$E_{osc} = E_2 \sin (\omega_c t + \theta)$$

The output of a phase detector subject to these two input signals is obtained after multiplying and expanding as:

$$E_0 = \frac{E_1 E_2}{2} [\cos \theta + k \cos \theta \sin \omega_m t + \text{supersonic terms}]$$

in which the D.C. terms is:

$$E = _{DC} \frac{E_1 E_2 k \cos \theta}{2}$$

and the modulation term is:

$$E_{MOD} = \frac{E_1 E_2 \cos \theta k}{2} \sin \omega_m t$$

For best results in such a system the value of $E_2$ should be quite large with respect to $E_1$ and the phase lock should be good to reduce $\theta$ to zero.

The response of a phase detector as above analyzed (which can be considered as a mixer with D.C. IF) in the presence of noise and interference is such that the chopped D.C. output signal applied to the error amplifier 28 produces a usuable null signal to the motor 29 in the presence of relatively high level interference. In the presence of random noise a weak signal is detected in the phase detector 17 with the output signal-to-noise ratio improved by 3 db plus an improvement over the conventional type of diode second detector due to the fact that a diode detector operating in the nonlinear rectification region for small signals produces smaller output than the linear frequency translation properties of the phase detector circuit. For a large signal-to-noise ratio the phase detector is better by 3 db and thus for all conditions of signal-to-noise ratio the phase detector circuit 17 will give superior results because of the avoidance of possible rectification effects which may increase the interference power within the audio spectrum.

The operation of the automatic frequency control loop in connection with oscillator 15 to provide a phase lock is accomplished by shifting the oscillator output by 90° in phase shifter 16 such that the oscillator 15 is maintained in phase with the signals received by the sense antenna 11. This result is obtained due to the action of phase detector 18 which produces zero output when the two input signals thereto are 90° out of phase. Since the oscillator 15 has its output shifted by 90° in the phase shifter 16 the phase detector 18 produces a signal for the feedback loop consisting of the filter 19 and reactance tube 21 which will maintain the oscillator 15 at the frequency of signals received on the antenna 11 and in phase therewith. The oscillator 15, being thus maintained in phase with the received signal on antenna 11, provides the proper reference after passing through phase shifter 16 which has the correct phase to operate in the phase detector 17 to produce the error control signals for the amplifier 28.

The phase detectors employed in the present invention may be demodulators of the type shown in Fig. 2 wherein a triode phase inverter 32 applies phase opposed signals from input terminal 37 to diodes 33, 34 while a second signal is coupled from terminal 38 to a second pair of diodes 35, 36 as shown. In the present invention the shifted oscillator output from the phase shifter 16 is applied to input 37 of the phase detector 32 while the chopped loop amplifier signal is applied to the diodes 35, 36 via terminal 38 for the second input signal. The audio signal output is obtained from terminal 39. In the corresponding phase detector 18 in the AFC circuit, the signal of sense antenna 11 is applied to the diodes 35, 36 from the sense amplifier 13.

In a system of the type disclosed cross-coupling and leakage between the various circuits is required to be reduced to a minimum and for this purpose adequate shielding and decoupling techniques are to be provided in accordance with good design practice. The output coupling from the sense amplifier 13, the loop amplifier 14 and from the oscillator 15 may be taken by means of cathode follower amplifiers for the purpose of further reducing cross-coupling between the various circuits.

With an automatic direction finding equipment constructed in accordance with the principles of the present invention consistently better results were obtained over comparable commercial ADF equipments which employ a local oscillator and an IF amplifier for amplifying and detecting the received signals. The improved results comprise an ability to obtain an accurate direction indication in the presence of noise where the same signal was such as to render the indication of the conventional ADF equipment completely unreliable. In addition to the improved operation the simplicity of the circuits of the present invention permit the reduction of cost, size and weight of what is essentially a portable and often an airborne system to be reduced to an absolute minimum. Conventional miniaturization and transistorization techniques may be readily adapted to the present system.

Many other modifications will be apparent to those skilled in the art in the light of the present teaching and are to be understood as within the spirit and scope of the present invention as defined in the appended claims.

We claim:

1. An automatic direction finding radio receiver comprising a sense antenna, a rotatable loop antenna, a first broad band amplifier coupled to said loop antenna, a second broad band amplifier coupled to said sense antenna, a variable tuned circuit in the input of each of said amplifiers for selectively tuning over a predetermined frequency band, a variable frequency oscillator tunable over said predetermined band, means for gang tuning to the same frequency said amplifiers and said oscillator, first and second phase detectors, means for coupling signals from said oscillator to both said phase detectors, means for coupling the outputs of said first and second amplifiers to said first and second phase detectors respectively, means responsive to output signals from said first phase detector for automatically orienting said loop antenna to a null position, and an automatic frequency control circuit for said oscillator responsive to output signals from said second phase detector.

2. An automatic direction finding radio receiver comprising an omnidirectional antenna, a directional antenna having a rotatable directional characteristic, a first broad band amplifier coupled to said directional antenna, a second broad band amplifier coupled to said omnidirectional antenna, a variable tuned circuit in each of said amplifiers for selectively tuning over a predetermined frequency band, a variable frequency oscillator tunable over said predetermined band, means for gang tuning to the same frequency said amplifiers and said oscillator, first and second phase detectors, means for coupling signals from said oscillator to both said phase detectors, means for coupling the outputs of said first and second amplifiers to said first and second phase detectors respectively, means responsive to output signals from said first phase detector for automatically orienting said directional characteristic of said directional antenna to a null position relative to the bearing of a signal source to which said amplifiers are tuned, and an automatic frequency control circuit for said oscillator responsive to output signals from said second phase detector.

3. An automatic direction finding radio receiver comprising an omnidirectional antenna, a directional antenna having an orientable directional characteristic, a first broad band amplifier coupled to said directional antenna, a second broad band amplifier coupled to said omnidirectional antenna, a variable tuned circuit in each of said amplifiers for selectively tuning over a predetermined frequency band, a variable frequency oscillator tunable over said predetermined band, means for selectively tuning said amplifiers and said oscillator to the same frequency corresponding to a radiated signal in said frequency band, a phase detector, means for coupling oscillator signals and signals from said first amplifier to said phase detector with a phase relation for producing a servo signal of polarity and magnitude representative of the sense and magnitude of the angular deviation of said directional characteristic from a bearing direction to the source of said radiated signal, means responsive to said servo signal for orienting said directional characteristic to produce a null, and means responsive to the output of said second amplifier for controlling said oscillator to maintain a phase lock condition between the signal generated by said oscillator and said radiated signal.

4. Apparatus according to claim 3 in which the signal in said first amplifier is amplitude modulated at a low reference frequency and said orienting means includes a motor energized by said reference frequency.

5. An automatic direction finding radio receiver comprising an omnidirectional antenna, a directional antenna having an orientable directional characteristic, a first broad band amplifier coupled to said directional antenna, a second broad band amplifier coupled to said omnidirectional antenna, a variable tuned circuit in each of said amplifiers for selectively tuning over a predetermined frequency band, a variable frequency oscillator tunable over said predetermined band, means for selectively tuning said amplifiers and said oscillator to the same frequency corresponding to a radiated signal in said frequency band, a phase detector, means for coupling oscillator signals and signals from said first amplifier to said phase detector with a phase relation for producing a servo signal of polarity and magnitude representative of the sense and magnitude of the angular deviation of said directional characteristic from a bearing direction to the source of said radiated signal, means responsive to said servo signal for orienting said directional characteristic to produce a null, a second phase detector, means for coupling phase shifted oscillator signals and signals from said second amplifier to said second phase detector for producing an output automatic frequency control signal, a low pass filter, a signal controlled frequency determining element coupled to said oscillator, circuit means coupling said automatic frequency control signal through said low pass filter to said frequency determining element to maintain a phase lock condition between the signal generated by said oscillator and said radiated signal.

6. Apparatus according to claim 5 having in addition an audio frequency mixer, circuit means for coupling signals from the output of said second amplifier and signals from said oscillator to said audio mixer to detect audio modulation signals carried by said second amplifier signal, and a low pass audio channel coupled to the output of said audio mixer.

7. An automatic direction finding radio receiver comprising a sense antenna, a rotatable loop antenna, a first broad band amplifier coupled to said loop antenna, a second broad band amplifier coupled to said sense antenna, a variable tuned amplifier stage in each of said amplifiers for selectively tuning over a predetermined frequency band, a variable frequency oscillator tunable over said frequency band, means for gang tuning said stages and said oscillator to the same frequency corresponding to a radiated signal in said frequency band, first and second phase detectors each having two input circuits and an output circuit and being adapted to produce zero output signal for a ninety degree phase difference between signals applied to said two input circuits and a signal varying in polarity and magnitude in accordance with deviations from said ninety degree phase difference, means for one hundred percent amplitude modulating signals in said first amplifier at a reference frequency, a ninety degree phase shifter coupled to said oscillator, means for coupling said amplitude modulated signals and oscillator signals from said phase shifter to the two inputs of said first phase detector, a reference frequency amplifier coupled to the output of said first phase detector, a servo motor energized by said reference frequency, means for rotatably driving said loop antenna with said servo motor, means coupling the output of said reference frequency amplifier to said servo motor to drive said loop to a null for said radiated signal, means for coupling signals from said second amplifier and oscillator signals from said phase shifter to the two inputs of said second phase detector, a low pass filter, a signal controlled frequency determining element coupled to said oscillator, and circuit means for coupling the output of said second phase detector to said low pass filter and the output of said filter to said frequency determining element to maintain a phase lock condition between the signal generated by said oscillator and said radiated signal.

No references cited.